(12) United States Patent
McAlister (10) Patent No.: US 9,115,325 B2
(45) Date of Patent: Aug. 25, 2015

(54) SYSTEMS AND METHODS FOR UTILIZING ALCOHOL FUELS

(71) Applicant: McAlister Technologies, LLC, Phoenix, AZ (US)

(72) Inventor: Roy Edward McAlister, Phoenix, AZ (US)

(73) Assignee: MCALISTER TECHNOLOGIES, LLC, Phoenix, AZ (US)

(*) Notice: Subject to any disclaimer, the term of this patent is extended or adjusted under 35 U.S.C. 154(b) by 0 days.

(21) Appl. No.: 13/831,748

(22) Filed: Mar. 15, 2013

(65) Prior Publication Data

US 2014/0130401 A1      May 15, 2014

Related U.S. Application Data

(60) Provisional application No. 61/725,450, filed on Nov. 12, 2012.

(51) Int. Cl.
*C10L 1/182*      (2006.01)
*C10L 1/04*       (2006.01)
*H01M 8/04*       (2006.01)

(52) U.S. Cl.
CPC ............ *C10L 1/1824* (2013.01); *C10L 1/04* (2013.01); *C10L 2200/0469* (2013.01); *C10L 2270/06* (2013.01); *C10L 2290/06* (2013.01); *H01M 8/04089* (2013.01)

(58) Field of Classification Search
USPC .............. 429/422, 41, 416, 434; 110/229; 123/295, 297, 299, 41.31; 204/165; 205/343; 431/254; 60/317, 682; 137/334; 44/307, 349, 385, 388, 405, 44/417, 451; 48/197 FM
See application file for complete search history.

(56) References Cited

U.S. PATENT DOCUMENTS

| 1,451,384 | A | 4/1923 | Whyte |
| 1,765,237 | A | 6/1930 | King |
| 2,255,203 | A | 9/1941 | Wiegand |
| 3,058,453 | A | 10/1962 | May |
| 3,060,912 | A | 10/1962 | May |

(Continued)

FOREIGN PATENT DOCUMENTS

| DE | 3443022 A1 | 5/1986 |
| DE | 10308914 A1 | 9/2004 |

(Continued)

OTHER PUBLICATIONS

U.S. Appl. No. 13/843,976, McAlister.

(Continued)

*Primary Examiner* — Cephia D Toomer
*Assistant Examiner* — Chantel Graham
(74) *Attorney, Agent, or Firm* — Loeb & Loeb LLP (57) ABSTRACT

Methods, systems, and devices are disclosed for producing, storing and using alcohol fuels. In one aspect of the disclosed technology, a method to provide a fuel for an engine includes mixing an alcohol with water to produce a wet alcohol, adding a fuel constituent in the wet alcohol to form a liquid fuel, the fuel constituent being soluble in the wet alcohol, and converting, in a container having an interior formed of an armored material, the liquid fuel into a gaseous fuel substance using at least one of heat energy or electrical energy to pressurize the liquid fuel, the gaseous fuel substance exhibiting a higher pressure and lower density than that of the liquid fuel.

24 Claims, 6 Drawing Sheets

(56) References Cited

U.S. PATENT DOCUMENTS

| | | | |
|---|---|---|---|
| 3,081,758 A | 3/1963 | May | |
| 3,243,335 A | 3/1966 | Faile | |
| 3,373,724 A | 3/1968 | Papst | |
| 3,391,680 A | 7/1968 | Benson | |
| 3,520,961 A | 7/1970 | Suda et al. | |
| 3,594,877 A | 7/1971 | Suda et al. | |
| 3,608,050 A | 9/1971 | Carman et al. | |
| 3,689,293 A | 9/1972 | Beall | |
| 3,926,169 A | 12/1975 | Leshner et al. | |
| 3,931,438 A | 1/1976 | Beall et al. | |
| 3,960,995 A | 6/1976 | Kourkene | |
| 3,976,039 A | 8/1976 | Henault | |
| 3,997,352 A | 12/1976 | Beall | |
| 4,045,092 A | 8/1977 | Keller | |
| 4,066,046 A | 1/1978 | McAlister | |
| 4,095,580 A | 6/1978 | Murray et al. | |
| 4,116,389 A | 9/1978 | Furtah et al. | |
| 4,122,816 A | 10/1978 | Fitzgerald et al. | |
| 4,135,481 A | 1/1979 | Resler, Jr. | |
| 4,203,393 A | 5/1980 | Giardini | |
| 4,330,732 A | 5/1982 | Lowther | |
| 4,332,223 A | 6/1982 | Dalton | |
| 4,364,342 A | 12/1982 | Asik | |
| 4,364,363 A | 12/1982 | Miyagi et al. | |
| 4,368,707 A | 1/1983 | Leshner et al. | |
| 4,377,455 A | 3/1983 | Kadija et al. | |
| 4,381,740 A | 5/1983 | Crocker | |
| 4,382,189 A | 5/1983 | Wilson | |
| 4,469,160 A | 9/1984 | Giamei | |
| 4,483,485 A | 11/1984 | Kamiya et al. | |
| 4,511,612 A | 4/1985 | Huther et al. | |
| 4,528,270 A | 7/1985 | Matsunaga | |
| 4,536,452 A | 8/1985 | Stempin et al. | |
| 4,567,857 A | 2/1986 | Houseman et al. | |
| 4,574,037 A | 3/1986 | Samejima et al. | |
| 4,677,960 A | 7/1987 | Ward | |
| 4,688,538 A | 8/1987 | Ward et al. | |
| 4,700,891 A | 10/1987 | Hans et al. | |
| 4,733,646 A | 3/1988 | Iwasaki | |
| 4,736,718 A | 4/1988 | Linder | |
| 4,742,265 A | 5/1988 | Giachino et al. | |
| 4,760,818 A | 8/1988 | Brooks et al. | |
| 4,760,820 A | 8/1988 | Tozzi | |
| 4,774,914 A | 10/1988 | Ward | |
| 4,774,919 A | 10/1988 | Matsuo et al. | |
| 4,834,033 A | 5/1989 | Larsen | |
| 4,841,925 A | 6/1989 | Ward | |
| 4,922,883 A | 5/1990 | Iwasaki | |
| 4,967,708 A | 11/1990 | Linder et al. | |
| 4,977,873 A | 12/1990 | Cherry et al. | |
| 4,982,708 A | 1/1991 | Stutzenberger | |
| 5,034,852 A | 7/1991 | Rosenberg | |
| 5,055,435 A | 10/1991 | Hamanaka et al. | |
| 5,056,496 A | 10/1991 | Morino et al. | |
| 5,069,189 A | 12/1991 | Saito | |
| 5,076,223 A | 12/1991 | Harden et al. | |
| 5,095,742 A | 3/1992 | James et al. | |
| 5,109,817 A | 5/1992 | Cherry | |
| 5,131,376 A | 7/1992 | Ward et al. | |
| 5,150,682 A | 9/1992 | Magnet | |
| 5,193,515 A | 3/1993 | Oota et al. | |
| 5,207,208 A | 5/1993 | Ward | |
| 5,211,142 A | 5/1993 | Matthews et al. | |
| 5,220,901 A | 6/1993 | Morita et al. | |
| 5,267,601 A | 12/1993 | Dwivedi | |
| 5,297,518 A | 3/1994 | Cherry | |
| 5,305,360 A | 4/1994 | Remark et al. | |
| 5,328,094 A | 7/1994 | Goetzke et al. | |
| 5,343,699 A | 9/1994 | McAlister | |
| 5,377,633 A | 1/1995 | Wakeman | |
| 5,392,745 A | 2/1995 | Beck | |
| 5,421,299 A | 6/1995 | Cherry | |
| 5,435,286 A | 7/1995 | Carroll, III et al. | |
| 5,439,532 A | 8/1995 | Fraas | |
| 5,456,241 A | 10/1995 | Ward | |
| 5,475,772 A | 12/1995 | Hung et al. | |
| 5,497,744 A | 3/1996 | Nagaosa et al. | |
| 5,517,961 A | 5/1996 | Ward | |
| 5,531,199 A | 7/1996 | Bryant et al. | |
| 5,549,746 A | 8/1996 | Scott et al. | |
| 5,584,490 A | 12/1996 | Inoue et al. | |
| 5,588,299 A | 12/1996 | DeFreitas | |
| 5,605,125 A | 2/1997 | Yaoita | |
| 5,607,106 A | 3/1997 | Bentz et al. | |
| 5,662,389 A | 9/1997 | Truglio et al. | |
| 5,676,026 A | 10/1997 | Tsuboi et al. | |
| 5,699,253 A | 12/1997 | Puskorius et al. | |
| 5,702,761 A | 12/1997 | DiChiara, Jr. et al. | |
| 5,704,321 A | 1/1998 | Suckewer et al. | |
| 5,715,788 A | 2/1998 | Tarr et al. | |
| 5,738,818 A | 4/1998 | Atmur et al. | |
| 5,746,171 A | 5/1998 | Yaoita | |
| 5,767,026 A | 6/1998 | Kondoh et al. | |
| 5,797,427 A | 8/1998 | Buescher | |
| 5,806,581 A | 9/1998 | Haasch et al. | |
| 5,853,175 A | 12/1998 | Udagawa | |
| 5,863,326 A | 1/1999 | Nause et al. | |
| 5,876,659 A | 3/1999 | Yasutomi et al. | |
| 5,915,272 A | 6/1999 | Foley et al. | |
| 5,941,207 A | 8/1999 | Anderson et al. | |
| 5,947,091 A | 9/1999 | Krohn et al. | |
| 5,983,855 A | 11/1999 | Benedikt et al. | |
| 6,000,628 A | 12/1999 | Lorraine | |
| 6,017,390 A | 1/2000 | Charych et al. | |
| 6,026,568 A | 2/2000 | Atmur et al. | |
| 6,062,498 A | 5/2000 | Klopfer | |
| 6,081,183 A | 6/2000 | Mading et al. | |
| 6,085,990 A | 7/2000 | Augustin | |
| 6,092,501 A | 7/2000 | Matayoshi et al. | |
| 6,092,507 A | 7/2000 | Bauer et al. | |
| 6,093,338 A | 7/2000 | Tani et al. | |
| 6,102,303 A | 8/2000 | Bright et al. | |
| 6,138,639 A | 10/2000 | Hiraya et al. | |
| 6,155,212 A | 12/2000 | McAlister | |
| 6,173,913 B1 | 1/2001 | Shafer et al. | |
| 6,185,355 B1 | 2/2001 | Hung | |
| 6,189,522 B1 | 2/2001 | Moriya | |
| 6,253,728 B1 | 7/2001 | Matayoshi et al. | |
| 6,267,307 B1 | 7/2001 | Pontoppidan | |
| 6,318,306 B1 | 11/2001 | Komatsu | |
| 6,335,065 B1 | 1/2002 | Steinlage et al. | |
| 6,360,721 B1 | 3/2002 | Schuricht et al. | |
| 6,378,485 B2 | 4/2002 | Elliott | |
| 6,386,178 B1 | 5/2002 | Rauch | |
| 6,453,660 B1 | 9/2002 | Johnson et al. | |
| 6,455,173 B1 | 9/2002 | Marijnissen et al. | |
| 6,478,007 B2 | 11/2002 | Miyashita et al. | |
| 6,506,336 B1 | 1/2003 | Beall et al. | |
| 6,517,011 B1 | 2/2003 | Ayanji et al. | |
| 6,532,315 B1 | 3/2003 | Hung et al. | |
| 6,561,168 B2 | 5/2003 | Hokao et al. | |
| 6,567,599 B2 | 5/2003 | Hung | |
| 6,578,775 B2 | 6/2003 | Hokao | |
| 6,583,901 B1 | 6/2003 | Hung | |
| 6,584,244 B2 | 6/2003 | Hung | |
| 6,587,239 B1 | 7/2003 | Hung | |
| 6,615,899 B1 | 9/2003 | Woodward et al. | |
| 6,619,269 B1 | 9/2003 | Stier et al. | |
| 6,626,164 B2 | 9/2003 | Hitomi et al. | |
| 6,663,027 B2 | 12/2003 | Jameson et al. | |
| 6,672,277 B2 | 1/2004 | Yasuoka et al. | |
| 6,700,306 B2 | 3/2004 | Nakamura et al. | |
| 6,705,274 B2 | 3/2004 | Kubo | |
| 6,722,340 B1 | 4/2004 | Sukegawa et al. | |
| 6,725,826 B2 | 4/2004 | Esteghlal | |
| 6,745,744 B2 | 6/2004 | Suckewer et al. | |
| 6,749,043 B2 | 6/2004 | Brown et al. | |
| 6,756,140 B1 | 6/2004 | McAlister | |
| 6,763,811 B1 | 7/2004 | Tamol, Sr. | |
| 6,766,965 B2 | 7/2004 | D'Arrigo | |
| 6,824,084 B2 | 11/2004 | Maier et al. | |
| 6,832,588 B2 | 12/2004 | Herden et al. | |
| 6,845,920 B2 | 1/2005 | Sato et al. | |
| 6,851,413 B1 | 2/2005 | Tamol, Sr. | |

(56) References Cited

U.S. PATENT DOCUMENTS

| | | | |
|---|---|---|---|
| 6,871,630 B2 | 3/2005 | Herden et al. | |
| 6,883,490 B2 | 4/2005 | Jayne | |
| 6,899,076 B2 | 5/2005 | Funaki et al. | |
| 6,904,893 B2 | 6/2005 | Hotta et al. | |
| 6,912,998 B1 | 7/2005 | Rauznitz et al. | |
| 6,925,983 B2 | 8/2005 | Herden et al. | |
| 6,940,213 B1 | 9/2005 | Heinz et al. | |
| 6,976,683 B2 | 12/2005 | Eckert et al. | |
| 6,994,073 B2 | 2/2006 | Tozzi et al. | |
| 7,007,658 B1 | 3/2006 | Cherry et al. | |
| 7,013,863 B2 | 3/2006 | Shiraishi et al. | |
| 7,025,358 B2 | 4/2006 | Ueta et al. | |
| 7,032,845 B2 | 4/2006 | Dantes et al. | |
| 7,070,126 B2 | 7/2006 | Shinogle | |
| 7,073,480 B2 | 7/2006 | Shiraishi et al. | |
| 7,086,376 B2 | 8/2006 | McKay | |
| 7,104,246 B1 | 9/2006 | Gagliano et al. | |
| 7,104,250 B1 | 9/2006 | Yi et al. | |
| 7,121,253 B2 | 10/2006 | Shiraishi et al. | |
| 7,131,426 B2 | 11/2006 | Ichinose et al. | |
| 7,140,347 B2 | 11/2006 | Suzuki et al. | |
| 7,249,578 B2 | 7/2007 | Fricke et al. | |
| 7,255,290 B2 | 8/2007 | Bright et al. | |
| 7,272,487 B2 | 9/2007 | Christen et al. | |
| 7,278,392 B2 | 10/2007 | Zillmer et al. | |
| 7,367,319 B2 | 5/2008 | Kuo et al. | |
| 7,395,146 B2 | 7/2008 | Ueda et al. | |
| 7,418,940 B1 | 9/2008 | Yi et al. | |
| 7,422,166 B2 | 9/2008 | Hoffmann et al. | |
| 7,481,043 B2 | 1/2009 | Hirata et al. | |
| 7,540,271 B2 | 6/2009 | Stewart et al. | |
| 7,554,250 B2 | 6/2009 | Kadotani et al. | |
| 7,625,531 B1 | 12/2009 | Coates et al. | |
| 7,626,315 B2 | 12/2009 | Nagase | |
| 7,650,873 B2 | 1/2010 | Hofbauer et al. | |
| 7,703,775 B2 | 4/2010 | Matsushita et al. | |
| 7,707,832 B2 | 5/2010 | Commaret et al. | |
| 7,714,483 B2 | 5/2010 | Hess et al. | |
| 7,728,489 B2 | 6/2010 | Heinz et al. | |
| 7,849,833 B2 | 12/2010 | Toyoda | |
| 7,886,993 B2 | 2/2011 | Bachmaier et al. | |
| 7,918,212 B2 | 4/2011 | Verdejo et al. | |
| 7,942,136 B2 | 5/2011 | Lepsch et al. | |
| 8,069,836 B2 | 12/2011 | Ehresman | |
| 8,686,171 B2* | 4/2014 | McNeff et al. | 554/170 |
| 2002/0017573 A1 | 2/2002 | Sturman | |
| 2002/0084793 A1 | 7/2002 | Hung et al. | |
| 2002/0131171 A1 | 9/2002 | Hung | |
| 2002/0131666 A1 | 9/2002 | Hung et al. | |
| 2002/0131673 A1 | 9/2002 | Hung | |
| 2002/0131674 A1 | 9/2002 | Hung | |
| 2002/0131706 A1 | 9/2002 | Hung | |
| 2002/0131756 A1 | 9/2002 | Hung | |
| 2002/0141692 A1 | 10/2002 | Hung | |
| 2002/0150375 A1 | 10/2002 | Hung et al. | |
| 2002/0151113 A1 | 10/2002 | Hung et al. | |
| 2003/0047626 A1 | 3/2003 | Maier et al. | |
| 2003/0047627 A1 | 3/2003 | Stier et al. | |
| 2003/0102386 A1 | 6/2003 | Sebastian et al. | |
| 2004/0008989 A1 | 1/2004 | Hung | |
| 2004/0060304 A1* | 4/2004 | Aceves et al. | 62/45.1 |
| 2004/0075000 A1 | 4/2004 | Ruehle et al. | |
| 2004/0164175 A1 | 8/2004 | Maeurer et al. | |
| 2005/0255011 A1 | 11/2005 | Greathouse et al. | |
| 2006/0005738 A1 | 1/2006 | Kumar | |
| 2006/0005739 A1 | 1/2006 | Kumar | |
| 2006/0144693 A1* | 7/2006 | Villalobos | 204/165 |
| 2007/0189114 A1 | 8/2007 | Reiner et al. | |
| 2007/0283927 A1 | 12/2007 | Fukumoto et al. | |
| 2008/0035116 A1 | 2/2008 | Scheffel et al. | |
| 2009/0093951 A1 | 4/2009 | McKay et al. | |
| 2011/0036309 A1 | 2/2011 | McAlister | |
| 2011/0048374 A1 | 3/2011 | McAlister | |
| 2012/0227389 A1* | 9/2012 | Hinderks | 60/317 |
| 2012/0264662 A1* | 10/2012 | DiBiase et al. | 508/178 |
| 2012/0297775 A1* | 11/2012 | Prabhu | 60/682 |

FOREIGN PATENT DOCUMENTS

| | | |
|---|---|---|
| DE | 102005060139 A1 | 6/2007 |
| EP | 392594 A2 | 10/1990 |
| EP | 671555 A1 | 9/1995 |
| EP | 1972606 A1 | 9/2008 |
| GB | 1038490 A | 8/1966 |
| JP | 61-023862 A | 2/1986 |
| JP | 02-259268 A | 10/1990 |
| JP | 08-049623 A | 2/1996 |
| JP | 2004-324613 A | 11/2004 |
| JP | 08-334077 A | 12/2008 |
| KR | 1990-0010205 | 7/1990 |
| KR | 2007-0026296 A | 3/2007 |
| KR | 2008-0073635 A | 8/2008 |
| WO | WO-2008-017576 A1 | 2/2008 |

OTHER PUBLICATIONS

U.S. Appl. No. 13/843,197, McAlister.

International Search Report and Written Opinion for Application No. PCT/US2010/002078; Applicant: McAlister Technologies, LLC.; Date of Mailing: Dec. 17, 2010 (9 pages.).

International Search Report and Written Opinion for Application No. PCT/US2010/002080; Applicant: McAlister Technologies, LLC.; Date of Mailing: Jul. 7, 2011 (8 pages).

"Ford DIS/EDIS "Waste Spark" Ignition System." Accessed: Jul. 15, 2010. Printed: Jun. 8, 2011. <http://rockledge.home.comcast.net/~rockledge/RangerPictureGallery/DIS_EDIS.htm>. pp. 1-6.

"P dV's Custom Data Acquisition Systems Capabilities." PdV Consulting. Accessed: Jun. 28, 2010. Printed: May 16, 2011. <http://www.pdvconsult.com/capabilities%20-%20daqsys.html>. pp. 1-10.

"Piston motion equations." Wikipedia, the Free Encyclopedia. Published: Jul. 4, 2010. Accessed: Aug. 7, 2010. Printed: Aug. 7, 2010. <http://en.wikipedia.org/wiki/Dopant>. pp. 1-9.

"Piston Velocity and Acceleration." EPI, Inc. Accessed: Jun. 28, 2010. Printed: May 16, 2011. <http://www.epi-eng.com/piston_engine_technology/piston_velocity_and_acceleration.htm>. pp. 1-3.

"SmartPlugs—Aviation." SmartPlugs.com. Published: Sep. 2000. Accessed: May 31, 2011. <http://www.smartplugs.com/news/aeronews0900.htm>. pp. 1-3.

Bell et al. "A Super Solar Flare." NASA Science. Published: May 6, 2008. Accessed: May 17, 2011. <http://science.nasa.gov/science-news/science-at-nasa/2008/06may_carringtonflare/>. pp. 1-5.

Birchenough, Arthur G. "A Sustained-arc Ignition System for Internal Combustion Engines." Nasa Technical Memorandum (NASA TM-73833). Lewis Research Center. Nov. 1977. pp. 1-15.

Britt, Robert Roy. "Powerful Solar Storm Could Shut Down U.S. For Months—Science News |Science & Technology |Technology News—FOXNews.com." FoxNews.com, Published: Jan. 9, 2009. Accessed: May 17, 2011. <http://www.foxnews.com/story/0,2933,478024,00.html>. pp. 1-2.

Brooks, Michael. "Space Storm Alert: 90 Seconds from Catastrophe." NewScientist. Mar. 23, 2009. pp.1-7.

Doggett, William. "Measuring Internal Combustion Engine In-Cylinder Pressure with LabVIEW." National Instruments. Accessed: Jun. 28, 2010. Printed: May 16, 2011. <http://sine.ni.com/cs/app/doc/p/id/cs-217>. pp. 1-2.

Erjavec, Jack. "Automotive Technology: a Systems Approach, vol. 2." Thomson Delmar Learning. Clifton Park, NY. 2005. p. 845.

Hodgin, Rick. "NASA Studies Solar Flare Dangers to Earth-based Technology." TG Daily. Published: Jan. 6, 2009. Accessed: May 17, 2011. <http://www.tgdaily.com/trendwatch/40830-nasa-studies-solar-flare-dangers-to-earth-based-technology>. pp. 1-2.

Hollembeak, Barry. "Automotive Fuels & Emissions." Thomson Delmar Learning. Clifton Park, NY. 2005. p. 298.

InfraTec GmbH. "Evaluation Kit for FPI Detectors |Datasheet—Detector Accessory." 2009. pp. 1-2.

(56) References Cited

OTHER PUBLICATIONS

Lewis Research Center. "Fabry-Perot Fiber-Optic Temperature Sensor." NASA Tech Briefs. Published: Jan. 1, 2009. Accessed: May 16, 2011. <http://www.techbriefs.com/content/view/2114/32/>.

Pall Corporation, Pall Industrial Hydraulics. Increase Power Output and Reduce Fugitive Emissions by Upgrading Hydrogen Seal Oil System Filtration. 2000. pp. 1-4.

Riza et al. "All-Silicon Carbide Hybrid Wireless-Wired Optics Temperature Sensor Network Basic Design Engineering for Power Plant Gas Turbines." International Journal of Optomechatronics, vol. 4, Issue 1. Jan. 2010. pp 1-9.

Riza et al. "Hybrid Wireless-Wired Optical Sensor for Extreme Temperature Measurement in Next Generation Energy Efficient Gas Turbines." Journal of Engineering for Gas Turbines and Power, vol. 132, Issue 5. May 2010. pp. 051601-1-51601-11.

Salib et al. "Role of Parallel Reformable Bonds in the Self-Healing of Cross-Linked Nanogel Particles." Langmuir, vol. 27, Issue 7. 2011. pp. 3991-4003.

International Search Report and Written Opinion for Application No. PCT/US2013/069746; Applicant McAlister Technologies, LLC.; Date of Mailing Feb. 27, 2014 (19 pages).

* cited by examiner

SYSTEMS AND METHODS FOR UTILIZING ALCOHOL FUELS

PRIORITY CLAIM

This patent document claims the priority of U.S. provisional application No. 61/725,450, entitled "SYSTEM AND METHOD FOR REDUCING THE RATE OF COMBUSTION AT ATMOSPHERIC PRESSURE" filed on Nov. 12, 2012,, the entire disclosure of the application 61/725,450, is incorporated herein by reference for all purposes.

TECHNICAL FIELD

This patent document relates to technologies that implement fuel alcohols.

BACKGROUND

An alcohol is an organic substance having a chemical formula of $C_nH_{2n+1}OH$. While not the dominant energy resource used throughout the world today, alcohols have been used as fuels throughout the course of history. The first four aliphatic alcohols include methanol, ethanol, propanol, and butanol. These alcohols, as well as others, can be used as fuels in current engines and systems. Fuel alcohols can be advantageous because they can be synthesized chemically or biologically, in some instances provide greater fuel economy than most fossil fuels (e.g., gasoline, diesel), and typically produce less harmful byproducts when burned.

BRIEF DESCRIPTION OF THE DRAWINGS

Like reference symbols and designations in the various drawings indicate like elements.

DETAILED DESCRIPTION

Techniques, systems, and devices are described for producing, storing and using alcohol fuels, e.g., at atmospheric pressures.

In one aspect of the disclosed technology, a method for producing an alcohol fuel includes a process to mix an alcohol with water to produce a wet alcohol and a process to add a fuel constituent in the wet alcohol, in which the fuel constituent is soluble in the wet alcohol.

In another aspect, a method to provide a fuel for an engine includes a process to mix an alcohol with water to produce a wet alcohol, a process to add a fuel constituent in the wet alcohol to form a liquid fuel, in which the fuel constituent is soluble in the wet alcohol, and a process to convert the liquid fuel into a gaseous fuel substance using at least one of heat energy or electrical energy to pressurize the liquid fuel. The process to convert the liquid fuel is implemented in a container having an interior formed of an armored material, and the gaseous fuel substance exhibits a higher pressure and lower density than that of the liquid fuel.

In another aspect, a method to provide a fuel for an engine includes a process to mix an alcohol with water to produce a wet alcohol, a process to suspend a fuel constituent in the wet alcohol to form a liquid fuel, and a process to convert the liquid fuel into a gaseous fuel substance using at least one of heat energy or electrical energy to pressurize the liquid fuel. The process to convert the liquid fuel is implemented in a container having an interior formed of an armored material, and the gaseous fuel substance exhibits a higher pressure and lower density than that of the liquid fuel.

In another aspect, a method to provide a fuel for an engine includes a process to mix formic acid with water to produce a liquid fuel, a process to add a fuel constituent in the liquid fuel, the fuel constituent being soluble in the liquid fuel, and a process to convert, in a container having an interior formed of an armored material, the liquid fuel into a gaseous fuel substance using at least one of heat energy or electrical energy to pressurize the liquid fuel, the gaseous fuel substance exhibiting a higher pressure and lower density than that of the liquid fuel.

In another aspect, a system for fuel storage includes a fuel storage unit to contain a liquid fuel substance stored at a low pressure, a fuel conversion unit to convert the liquid fuel substance into a gaseous fuel substance using at least one of heat energy or electrical energy to pressurize the liquid fuel substance, in which the fuel conversion unit includes a tank having an interior formed of an armored material, and a fluid transfer unit including a low pressure pump to deliver the liquid fuel substance from the fuel storage unit to the fuel conversion unit, in which the gaseous fuel substance exhibits a higher pressure and lower density than that of the liquid fuel substance.

Methanol is an alcohol that can be used as a fuel in a variety of applications. Methanol presents several advantages when used as a fuel. Methanol is biodegradable in both aerobic (oxidizing) and anaerobic (reducing) environments. For example, this prevents methanol from persisting in the environment, e.g., in the instance of a fuel leak. The half-life for methanol in groundwater is one to seven days. In comparison, for example, many common components of gasoline and the products of incomplete combustion of fossil fuels like gasoline may have half-lives in the hundreds of days, e.g., such as the carcinogen benzene, which has a half-life of 20-730, days. Thus, because of the high rate that methanol biodegrades, it is unlikely to accumulate in groundwater, surface water, air, or soil.

Methanol does pose some serious concerns for use in any application. For example, methanol is highly toxic to humans and animals, e.g., usually internalized by means of inhalation, ingestion, or absorption through the skin. Methanol can be fatal due to its central nervous system (CNS) depressant effects, e.g., which include decreased heart and breathing rates along with loss of consciousness. Also, methanol can cause a chemically toxic response when metabolized. For example, methanol can be metabolized to create formic acid via formaldehyde in a process initiated by the enzyme alcohol dehydrogenase in the liver. The formic acid can result in death because it inhibits mitochondrial cytochrome c oxidase, e.g., which can result in hypoxia at the cellular level, metabolic acidosis, or other metabolic disturbances. Exemplary antidotes can include ethanol and fomepizole, both of which reduce the action of alcohol dehydrogenase so that the methanol can be excreted through the kidneys before toxic formaldehyde or formic acid is formed. Similarly hemodialysis or hemodiafiltration may be utilized to accelerate the removal of methanol, formaldehyde, and formic acid. Additional safety concerns regarding methanol arise because it is difficult to differentiate from ethanol, which is generally considered to be a safe alcohol since it is used as the primary alcohol substance in popular alcoholic beverages.

Despite the potential for toxicity problems, pure methanol has been deemed to be a safer fuel than gasoline. For example, methanol replaced gasoline as the primary fuel in open wheel auto racing from the 1960s to 2007,, after which, for example, some racing organizations like IndyCars switched to ethanol (which may largely have been in response to lobbying efforts by grain alcohol promoters). The switch to methanol was prompted based on the tragedy in the 1964, Indianapolis 500, race, in which a devastating crash ignited gasoline that was leaking from ruptured fuel tanks and killed two renowned drivers, Dave MacDonald and Eddie Sachs. Methanol burns in a nearly transparent flame and at atmospheric pressure produces heat at only about 20% of the rate that gasoline combusts. Methanol flames can be extinguished by cooling and blocking oxygen with plain water, as compared to petroleum fires that produce injurious burns because of their intense infrared and bright-colored radiation and cannot be extinguished easily with water.

Techniques, systems, and devices are disclosed for producing, storing and using alcohol fuels, e.g., at atmospheric pressures.

In one aspect of the disclosed technology, a system for producing a fuel, e.g., with improved fuel safety for storage and use, includes a unit for low-pressure storage of liquid fuel substances. The system includes a unit for delivering the liquid fuel substances via a low-pressure pump into a fuel conversion unit, which, for example, can include a tank having a smaller volume and an armored interior. The fuel conversion unit converts the liquid fuel to a gaseous fuel. In some implementations, the fuel conversion unit applies heat and/or electrical energy to pressurize the liquid fuel by thermal expansion and/or conversion to less dense phases to form the gaseous fuel. For example, the system can provide several advantages for fuel storage including, but not limited to, reducing the amount and residence time of stored liquid fuel, which can be the source of potential dangerous consequences from the escape of gases given off by the stored liquid fuels.

In some embodiments, a system for storing fuel includes a fuel storage unit to contain a liquid fuel substance stored at a low pressure, a fuel conversion unit to convert the liquid fuel substance into a gaseous fuel substance using at least one of heat energy or electrical energy to pressurize the liquid fuel substance, in which the fuel conversion unit includes a tank having an interior formed of an armored material, and a fluid transfer unit including a low pressure pump to deliver the liquid fuel substance from the fuel storage unit to the fuel conversion unit, in which the gaseous fuel substance exhibits a higher pressure and lower density than that of the liquid fuel substance.

Exemplary armor materials that can be used in the tank of the fuel conversion unit can include, but are not limited to, high-strength stainless steels or super alloys, e.g., Hastelloy (e.g., C22,, X), Inconel (e.g., IN100,, IN600,, IN713), Waspaloy, Rene alloys (e.g., Rene 41,, Rene 80,, Rene 95,, Rene N5), Haynes alloys, Incoloy, MP98T, TMS alloys, and CMSX (e.g., CMSX-4) single crystal alloys, as well as super-tubes that may be made of composites including multilayers of stainless steel or super alloys, silicon carbide or carbon fibers or nanotubes, partially stabilized zirconia or spinel and high toughness aluminum. Additionally, for example, in cooler zones, exemplary armor materials may include polymers such as polyimides including Kevlar film and/or fiber. Additionally, for example, in application zones and instances that additional cut-through resistance is needed, overlays of woven wire jackets can provide improved safety. In particularly sensitive applications, for example, such exemplary over-woven jackets may incorporate polyimide fibers over high-strength stainless steel wire layers to enable electronic monitoring of the conductive stainless steel to detect any cut-through of the polyimide layer as an early warning alarm embodiment.

In some embodiments of the disclosed system for fuel production, storage and utilization, the system can be configured to (a) produce a fuel with higher specific heat, (b) produce a fuel with reduced vapor pressure, (c) produce a fuel with reduced penetration capability into a living cell, (d) produce vaporous fuel constituents that escape more rapidly than liquid fuel constituents, (e) produce gaseous fuel constituents that escape more rapidly than liquid fuel constituents, (f) utilize armor material (e.g., plating of critical portions of a storage interior) in a fuel storage and/or delivery systems, (g) collect and/or detect fuel substance leaks to prevent harmful escape, (h) transfer fuel substance leaks to safe blow down and dissipation provisions, (i) transfer fuel substances in case of over pressure limits to one or more safe blow down receivers, (j) control the shutoff of valves of the system to prevent dangerous escape of fuel substances, (k) control the shutoff of a fuel ignition system(s) interfaced or integrated with the disclosed fuel system, (I) control the shutoff of a fuel pump interfaced or integrated with the disclosed fuel system, and/or (m) provide total armored containment of fuel from pressurization locations to the fuel cell conversion chamber or combustion chamber of an internal combustion engine.

In another aspect of the disclosed technology, a method for producing an alcohol fuel includes a process to mix an alcohol with water to produce a wet alcohol and a process to add a fuel constituent in the wet alcohol, in which the fuel constituent is soluble in the wet alcohol.

The processes of the method can be implemented in the following exemplary ways and/or to provide one or more of the following exemplary features. For example, the alcohol used in the process can be a substantially pure alcohol. For example, the alcohol used in the process can include methanol. In some implementations, for example, the method can further comprise a process to create the methanol by implementing a process to apply heat to a methane feedstock substance to produce hydrogen and a carbon substance and a process to react the hydrogen with carbon dioxide to create the methanol and water. For example, the methane feedstock substance used in the process can be supplied from exhaust gas produced by an engine. In some implementations, for example, the process to add the fuel constituent includes a process to suspend an exemplary insoluble fuel constituent into the wet alcohol. For example, the fuel constituents used in the process can include, but is not limited to, urea, cellulose, starch, lipids, carbohydrates, amino acids, proteins, and/or food products. Illustratively, food and other organic wastes can be emulsified with the wet alcohol and may utilize various surfactants, e.g., including nonionic ethoxylated alkyphenol, to combine these exemplary organic substances in a homogeneous mixture. For example, substances that ordinarily are wasted in landfills or sewage disposal plants and release carbon dioxide and/or methane can thus become useful fuels to replace fossil fuels and greatly reduce net greenhouse gas production. In some implementations, for example, the method can further comprise a process to add an odorizing agent to provide a scent to the wet alcohol. For example, the odorizing agent used in the process can include, but is not limited to, wintergreen oil, methyl salicylate, or peppermint.

Equations 1, and 2, describe an exemplary economical approach to implement the process to create an alcohol used to produce a fuel. For example, a feedstock substance (e.g., such as methane) can be utilized to produce an alcohol fuel (e.g., such as methanol). For example, Equation 1, shows that applying heat to a feedstock such as methane (e.g., supplied to the process from wastes or fossil sources) can convert the methane feedstock to hydrogen and carbon, in which the carbon can be utilized for production of durable goods. As shown in exemplary Equation 2,, the co-produced hydrogen can be reacted with carbon dioxide (e.g., from the atmosphere or more concentrated sources) to produce "wet alcohol" illustratively shown here as a mixture of methanol and water.

$$CH_4 + \Delta \rightarrow C + 2H_2 \qquad (Eq. 1)$$

$$3H_2 + CO_2 \rightarrow CH_3OH + H_2O \qquad (Eq. 2)$$

For example, wet alcohol such as wet ethanol or methanol produced by processes such as the exemplary process in Equation 2, can be safer to manufacture, distribute, and use, as well as being particularly inexpensive as compared to gasoline and diesel fuel or processes that provide dry, neat, or otherwise essentially pure alcohol, e.g., such as pure methanol. The described method to produce wet alcohol such as methanol and water mixed in stoichiometric or non-stoichiometric proportions is a safer mixture that also has a capacity for suspending or otherwise including other fuel constituents, e.g., such as soluble wastes from the food or paper industries. For example, in some applications, the disclosed wet alcohol system and methods can serve as an enhanced hydrogen donor in the endothermic production of pressurized hydrogen and carbon dioxide and in mixtures that are further modified by additional soluble or otherwise suspended reactants.

In some implementations, the method can further include a process to pressurize the liquid wet alcohol fuel to produce gaseous fuels having a higher pressure and lower density. For example, the process can include pressurizing a low/non-pressurized storage unit containing one or more liquid fuels. In some examples, the process can include transferring heat to produce one or more vapor phases of the same chemical compounds that comprise the liquid phases of the fuel.

In other implementations, the method can include a process to pressurize the liquid wet alcohol fuel by forming gaseous fuels or one or more products, e.g., by reversing the reaction described in Equation 2, or by implementing the reaction shown in Equations 3 or 4. For example, two moles of liquid methanol and water can be used to produce four moles of self-pressurized gaseous hydrogen and carbon dioxide.

Equation 3, shows the conversion of an exemplary fuel composition containing methanol, water, and a carbon donor substance "C", e.g., as a fuel constituent, and waste heat (Δ) into gaseous fuel with much greater chemical and pressure energy-conversion potentials. For example, the carbon donor substance can include, but is not limited to, soluble urea, cellulose, starch, lipids, carbohydrates, or another waste product of the food industry. In addition to producing a gaseous fuel with greater chemical and pressure energy-conversion potentials, for example, the conversion of the exemplary fuel composition described in Equation 3, can also provide improved fuel storage safety for a variety of systems.

$$CH_3OH + H_2O + \text{"C"} + \Delta \rightarrow 2CO + 3H_2 \qquad (Eq. 3)$$

Equation 4, shows another exemplary alcohol (e.g., one of numerous selected processes) for conversion of another exemplary fuel composition containing ethanol, water and a carbon donor substance "C" (e.g., fuel constituent), and waste heat (Δ) into similarly pressurized gaseous fuel constituents.

$$C_2H_5OH + 2H_2O + \text{"C"} + \Delta \rightarrow 3CO + 5H_2 \qquad (Eq. 4)$$

The exemplary process can be implemented in sub-systems for self-pressurization of fuel that can provide for the low-pressure pumped delivery of liquid fuel into a system circuit that provides heat transfer in cyclic operations that add heat to produce and deliver vaporous or gaseous fuel constituents with elevated pressures. Alternatively, for example, the exemplary process can be implemented using the liquid fuel from the exemplary low-pressure storage, in which the liquid fuel can be continuously added at the desired elevated pressure to one or more heat addition circuits by one or more efficient liquid pumps.

Alcohols such as methanol and ethanol are miscible with water in all proportions. For example, such solutions can provide improved safety because the vapor pressure and thus the amount of alcohol molecules that can become airborne above alcohol-water solutions are depressed. This reduces the availability of alcohol molecules for airborne transfer to animals. Fuel compositions that include alcohol and water also have increased specific heat. Thus, for example, such solutions are safer to use and handle because the rate of combustion at atmospheric pressure is reduced. In addition, for example, the concentration gradient with respect to the water content of living cells is reduced. This further reduces the rate that methanol may diffuse into living cells and/or the rate of dehydration, which greatly reduces the possibility of harm or toxic processes dangers.

In some embodiments of the disclosed technology, surface active agents or other additives can be added to the wet alcohol fuels to stabilize water emulsions or colloidal suspensions with oil or lipid constituents. For example, applying suitable mixture emulsion and/or stabilization agents also improves fuel safety with other fuels such as gasoline and/or diesel fuel, which can reduce the production of vapors and combustion rates of potential fuel spills. For example, reducing the combustion rate of gasoline, such as in a fire caused by a gasoline spill, can prevent the rapid depletion of oxygen as well as asphyxiation and burns by contact and/or radiation suffered by victims exposed to such spill combustion incidents.

In some embodiments of the disclosed technology, the exemplary surface active stabilizing agents or other additives can be added to the wet alcohol fuels to prevent toxic process dangers and reduce the vaporous availability of methanol and/or the ability to penetrate skin and/or other cell walls. In some embodiments, the wet alcohol can further include odorizing agents to provide additional safety features to the fuel solution. For example, a suitably recognized odorizing agent such as may be provided by a small amount of wintergreen oil, methyl salicylate, peppermint, and/or other odorant selections. This can provide a readily detectible odorous warning of a liquid leakage, vaporizing conditions, or the possibility of a nearly invisible flame. In some embodiments, the wet alcohol can further include denaturing agents including formic acid to also provide additional safety features to the fuel solution. For example, formic acid can serve as a denaturing agent, odorizing agent, and detection agent in the fuel solution. Conversion of such exemplary soluble constituents into the gaseous products by the process of Equation 1, for delivery, e.g., by the exemplary armored circuit system into a combustion chamber of an engine, can greatly reduce or eliminate the potential for dangerously concentrated exposures to methanol and/or possibly toxic odorizing agents.

In another aspect of the disclosed technology, a method to provide a fuel for an engine includes a process to mix an alcohol with water to produce a wet alcohol, a process to add a fuel constituent in the wet alcohol to form a liquid fuel, in which the fuel constituent is soluble in the wet alcohol, and a process to convert the liquid fuel into a gaseous fuel substance using at least one of heat energy or electrical energy to pressurize the liquid fuel, in which the process to convert is implemented in a container having an interior formed of an armored material, and in which the gaseous fuel substance exhibits a higher pressure and lower density than that of the liquid fuel.

Figure 1A:
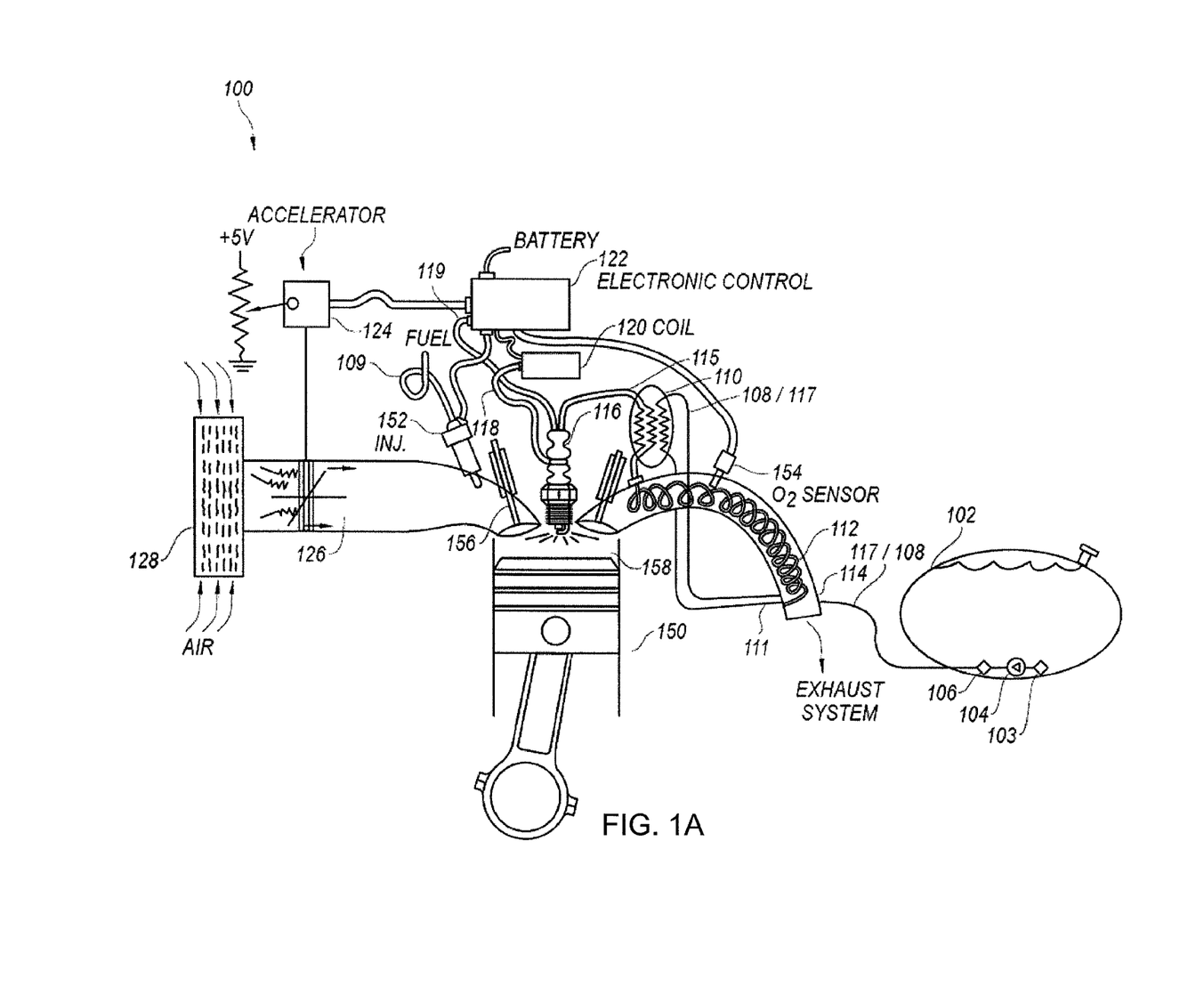
FIG. 1A shows a diagram of an exemplary system to convert a liquid fuel into a gaseous fuel substance.

For example, conversion of the liquid fuel solutions (e.g., such as the wet alcohol with fuel constituents) into gaseous fuel products provides another type and degree of safety. FIG. 1A shows a diagram of a system 100 to convert a liquid fuel into a gaseous fuel substance. The system 100 can be interfaced with an engine 150, e.g., which can include a combustion engine. In some implementations, the system 100 can be interfaced with a fuel cell. In some exemplary embodiments of the system 100, the system can utilize heat that is rejected from a fuel cell or a heat engine or from a regenerative braking system, as well as other heat producing systems, to produce the gaseous fuel constituents.

The system 100 includes a storage tank 102 to contain the liquid fuel to be converted into the gaseous fuel substance. The system includes a fuel pump 104 fluidically coupled to the storage tank 102, in which the fuel pump 104 can be configured as a ceramic, steel or stainless steel mechanical and/or electrical fuel pump. The fuel pump 104 can be used to transport the liquid fuel to a fuel conversion unit of the system 100 to convert the liquid fuel to a gaseous fuel. In some implementations, the system 100 can utilize the fuel pump 104 to pressurize the liquid fuel in the storage tank 102 and transport the pressurized liquid fuel. For example, the fuel pump 104 can cyclically pump the fuel in a process that greatly increases the pressure (e.g., such as from nominal psi to 10,000, psi) and additionally adds heat to the system 100 to produce and deliver elevated pressure vaporous or gaseous fuel.

The fuel conversion unit can include a group of components having a casing structure including an interior of an armored material. For example, the materials of the casing structures of the fuel conversion unit components can be forged, wrought, and/or swaged to form the armored interior structure. The fuel conversion unit includes a countercurrent heat exchanger assembly 110, which receives the liquid fuel via transporting conduits 117 and 108 (e.g., each can also be configured to include an armored material structure). For example, the liquid fuel pressurized and/or pumped by the fuel pump 104 passes through a filter 103 and a check valve 106 for delivery by the protected conduits 117 and 108 to the countercurrent heat exchanger assembly 110, e.g., which can be configured to have an interior of an armored material. The armored countercurrent heat exchanger assembly 110 can cool gases, e.g., such as the products of Equation 3, or 4,, from the reaction temperature of the endothermic process of Equations 3 or 4, (e.g., ranging from 900, to 2000° F. (about 482, to 1100° C.) to nearly the temperature of the fuel from the storage tank 102 (e.g., ranging from −60, to 150° F. (about −50, to 65° C.). The fluid fuel is subsequently transferred to an endothermic reactor and heat exchanger assembly 112 of the fuel conversion unit and is heated from the temperature that is substantially similar to that of the fuel from the storage tank 102 (e.g., ranging from −60, to 150° F. (about −50, to 65° C.) to an adaptively controlled temperature for achieving the desired conversion rate of gasification processes, e.g., exemplified in exemplary Equations 3, or 4, (e.g., the adaptively controlled temperature ranging from 900, to 2800° F. (about 482 to 1500° C.). For example, the higher pressure, less dense gaseous fuel converted from the liquid fuel, as exemplified by Equation 3, and/or Equation 4,, can be delivered into the combustion chamber 158 through armored conduit 115 and injector 116 as ambient temperature pressurized gaseous products with 30% or more chemical and/or pressure energy potential than the liquid feed stocks from tank 102. In addition, for example, the pressure that is produced by the conversion of relatively small volumes of such liquid fuel solutions into much larger controlled volumes of densely packed gaseous products can be used to increase the effectiveness of the countercurrent heat exchanger assembly 110, the power density of the engine 150, and efficiency of such combustion engines and/or fuel cells.

In operation, for example, liquid fuel that is pumped into the conduit 108 passes through the countercurrent heat exchanger assembly 110 of the fuel conversion unit and out via conduit 111 to enter the endothermic reactor and heat exchanger assembly 112 of the fuel conversion unit, e.g., to gain heat from engine coolant (not shown) and/or exhaust gases and/or further energy conversion, e.g., such as by regenerative electric resistance and/or inductive heating, to adaptively produce the reaction temperature and rate desired. For example, the endothermic reactor and heat exchanger assembly 112 can be configured within an exhaust pipe 114 from the engine 150, as shown. After sufficient heat gain, the liquid fuel reactants are converted to one or more pressurized gaseous constituents. In some examples, the liquid fuel reactants are converted to one or more pressurized gaseous constituents, as well as, if desired, the product components, e.g., like carbon, shown in Equation 1. For example, such hot gaseous constituents products from the process of the reactor and heat exchanger assembly 112 reenter the countercurrent heat exchanger assembly 110 to be cooled to temperatures substantially similar to that of the liquid fuel reactants from the storage tank 102. Accordingly, the pressurized and cooled gaseous fuel can be transported from the heat exchanger assembly 110 via the armored conduit 115 to be safely contained and directly injected by a fuel injector and/or ignition device 116 into the combustion chamber 158 of the engine 150 to be combusted. In some implementations, the disclosed system 100 can include the elimination of air throttling that is normally provided by air-inlet valve 126, which is accomplished by an electronic controller 122 of the system 100 to fully open the air-inlet valve 126 in normal response to all positions of an accelerator transducer 124. The controller 122 can be configured to receive and transmit signals using wireless communication techniques or using wired communication techniques, e.g., such as the cable 119. For example, the controller 122 can be configured by repurposing an existing electronic controller in an engine system. In some implementations, injection and ignition of such fuel constituents can be implemented by plasma generation that can be generated by repurposing the electronic controller 122 to drive a suitable fuel injection valve and transformer coil 120 and/or other circuit components as needed to provide suitable electrical processes for the voltage, current, wave forms and related values required.

For example, in the instance that such gaseous constituents escape from a storage tank or the process circuit, the leaked gaseous constituents leave the leakage zone more rapidly (e.g., in orders of magnitude) than the liquid precursors and become diffused in the atmosphere to concentrations below the flammable and toxicity danger limits. Such vaporization and/or gasification greatly reduces the time duration for combustion to potentially occur, e.g., when compared to a spill or leakage of equal energy equivalents as liquid fuel alcohols, gasoline or diesel fuel (e.g., a few seconds as compared to days or longer).

For example, the system 100 can be implemented in existing engine systems to provide the rapid and economical conversion of existing piston-powered vehicles (e.g., currently about one billion) now dedicated to gasoline or diesel fuel to improve operation with regard to safety and thermal efficiency. For example, most of the components in conventional fuel storage and metering systems can be repurposed as a comprehensive system to accomplish the new outcomes disclosed in this patent document to provide substantially greater safety. Existing fuel storage tanks made of steel or polymers, e.g., such as injection blow-molded polyolefin tanks, can be repurposed and utilized as the storage tank 102 to store liquid fuels such as the disclosed wet alcohols, e.g., some examples of which are generally shown as the exemplary reactant mixture in the Equations 3, and 4, previously shown. For example, conventional fuel pump designs (e.g., such as those that include aluminum or magnesium alloys) can be substituted by the fuel pump 104 (e.g., such as the steel or stainless steel mechanical and/or electrical fuel pumps), e.g., including diaphragm types, to avoid potential chemical reactions with such reactant mixtures.

In some implementations, one or more additional circuits of the fuel conversion unit for converting fuel from tank 102 to pressurized cooled gaseous constituents may be operated at controlled cycle times in parallel with the system 100 shown in FIG. 1A. For example, one or more additional circuits of the heat exchanger/reactor assemblies 110 and 112 and the corresponding conduits can be incorporated into the system 100. In some implementations, the system 100 includes the controller 122, which provides the ability to de-pressurize one such parallel circuits by useful pressure bleed down through an injector 152 to allow for the low-pressure recharging of the depressurized circuit with sufficient liquid inventory for subsequent pressurizing vaporization and/or product gas generation while high-pressure gaseous fuel is provided by another parallel circuit to the injector 116. Accordingly, for example, a relatively low-pressure liquid pump (e.g., such as the pump 104) can supply intermittent parallel flow to load the pressure boosting heat exchanges in one or more parallel and/or series circuits, e.g., such as those shown in the circuits 110 and 112, to provide reactions like those exemplified in Equations 3, or 4,, and may include one or more accumulators (not shown) to reduce pressure swings and/or to allow for the subsequent startup of a cold fuel cell or engine.

For example, the system 100 can be interfaced with the engine 150 such that an existing air filter 128 continues to be used as designed. For example, the previously utilized inlet port injector 152 may or may not be used, but it can be left in place for purposes of intermittent bleed down of pressure in the circuits of the system 100, e.g., including the heat exchanger assemblies 110 and 112, to allow the fluid conversion unit to be recharged with liquid from the tank 102 and/or retaining the option for original fuel delivery into throttled air. Similarly, for example, the system 100 can include an oxygen sensor 154 that may or may not be used, but it can be left in place for purposes of retaining the option to resume using the original fuel control system and operations.

For example, in instances where the exemplary injector 152 is used to bleed down the pressure in the exemplary circuit 110 and/or 112, it is beneficial to operate the injector 152 in unison with the opening of an air inlet valve 156 of the engine 150. This can be beneficial because it provides momentum to the pumping of air that is accelerated into the combustion chamber 158, and it improves the overall volumetric efficiency of the engine. In some examples, depending upon the fuel rate required to meet the power and performance requirements, the rate that fuel is injected by the injector 152 is relatively small compared to the opportunity to achieve higher air-utilization efficiency by injection using the injector 116 and ignition by RF or other plasma generation by energy delivered through the cable connection 118.

The system 100 can be implemented in a variety of applications including fuel cells and two- or four-stroke piston engines. For example, when applied in two- and four-stroke piston engines, it is particularly advantageous to inject high-pressure gaseous fuel constituents into the combustion chamber after the piston reaches top dead center position and thus add the pressure potential energy to performance by increasing torque and power production. The fuel injection and rapid combustion of such hydrogen-characterized constituents can be further tailored to the combustion chamber geometry and any swirl or pressure wave conditions to greatly reduce heat losses to combustion chamber components such as the piston, cylinder walls, valves and head surfaces.

Figure 1B:
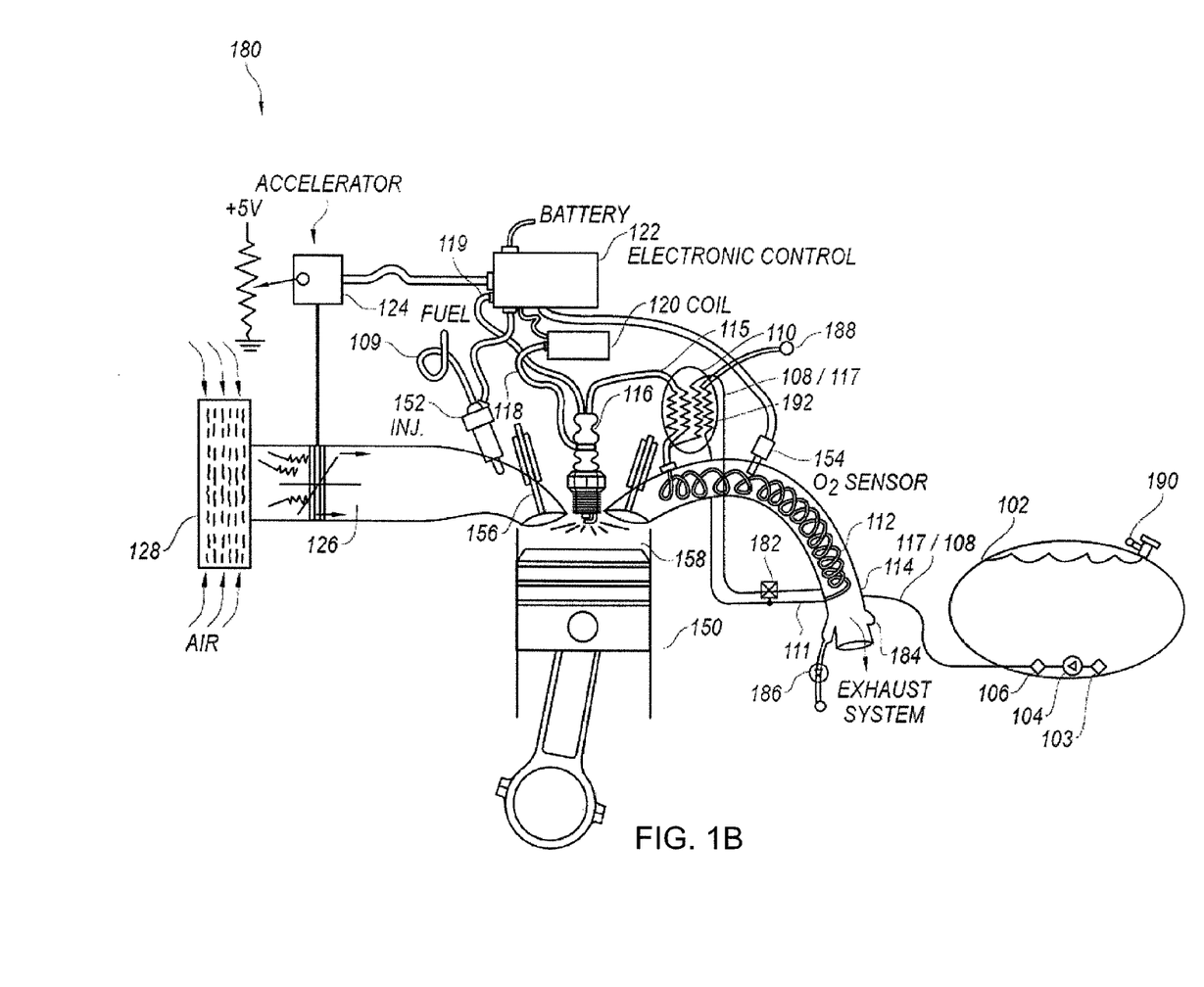
FIG. 1B shows a diagram of another embodiment of the exemplary system to convert a liquid fuel into a gaseous fuel substance.

FIG. 1B shows another embodiment of the system 100 shown as system 180. The system 180 is configured for transoceanic and/or transcontinental applications, among other applications, in which safety-trained personnel can practice the efficient transport of more dense water-free forms of fuels, e.g., including methanol, ethanol, etc. Water may be added at the site of distribution to the general public to achieve the purposes described herein, e.g., including contributing to health safety. The system 180 can provide for the dense storage of fuels such as fuel alcohols and can collect water from the exhaust of fuel cells and/or engines for similar operation to gain the benefits described in the embodiment of the system 100.

For example, at times that it is desired to collect water condensate from the exhaust stream, e.g., such as the exhaust pipe 114, in which a valve 182 of the system 180 diverts the coolest fuel from the tank 102 for delivery via the conduit 111 into the endothermic reactor and heat exchanger assembly 112 of the fuel conversion unit to provide cooling the exhaust gas inventory sufficiently to precipitate water for collection in a condensate collector and/or receiver 184. The condensate collector and/or receiver 184 may be of any suitable design, e.g., including the peripheral configuration as shown in FIG. 1B. For example, accordingly the separation may be aided by design of the assembly 112 of the fuel conversion unit to include a twisted fin tube assembly that maximizes heat transfer and imparts swirl acceleration to exhaust gases in the zone of operation by the collector/receiver 184. In some embodiments of the collector/receiver 184, such condensate separation and collection is improved by a suitable mechanical slinger that may be propelled by the exhaust gases or a suitable impetus, e.g., such as an electric motor and/or the wind, which would be provided by the motion of a vehicle may include wind-chill benefits. In some implementations, the system 180 is configured to utilize the controller 122 to operate a pump 186 to deliver such collected condensate water to the tank 102 for mixing with alcohol, e.g., to provide protection against freezing in cold weather. In some implementations, the system 180 is configured to utilize the controller 122 to operate the pump 186 to deliver such collected water through a connection 188 to be regeneratively heated in an additional circuit 192 of the fuel conversion unit. In some embodiments, the circuit 192 can be housed within the same armor-protected housing as the countercurrent heat exchanger assembly 110. The disclosed methods of providing reactant water can produce the benefits and products, e.g., as exemplified in Equations 3 or 4,, implemented using the system 180.

In particularly sensitive applications, for example, described embodiments of the armored protection is provided for tubes and conduits, e.g., such as 108, 109, 111, 115, 116, 117 and 118, along with the tank assembly 102 and casing units of the fuel conversion unit, among other components of the described systems. Such armored structures may also provide protection against radio frequency interference (RFI). Thus, long before any containment failure, the system 100 and/or 180 can be repaired or shut down to prevent conditions that could lead to accidental fuel leakage or loss of RFI protection.

Figure 1C:
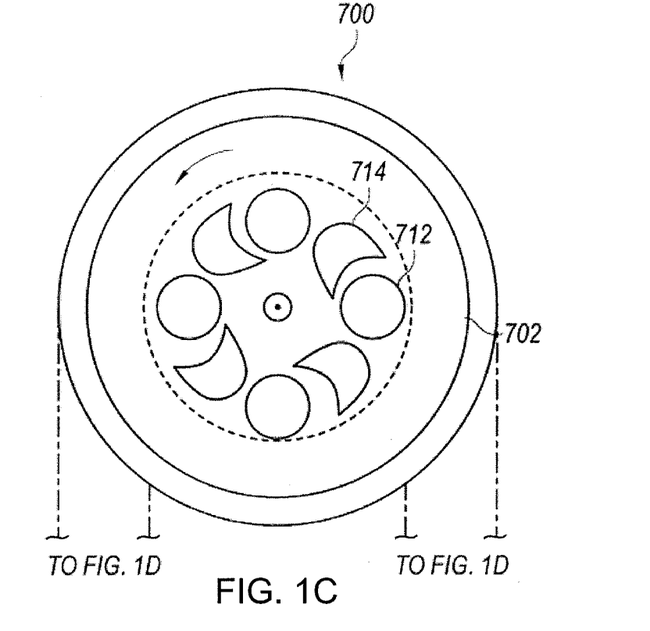
FIGS. 1C and 1D show an exemplary embodiment of an apparatus to combine the acoustical attenuation of exhaust noise with condensate water collection with additional safety capabilities.
Figure 1D:
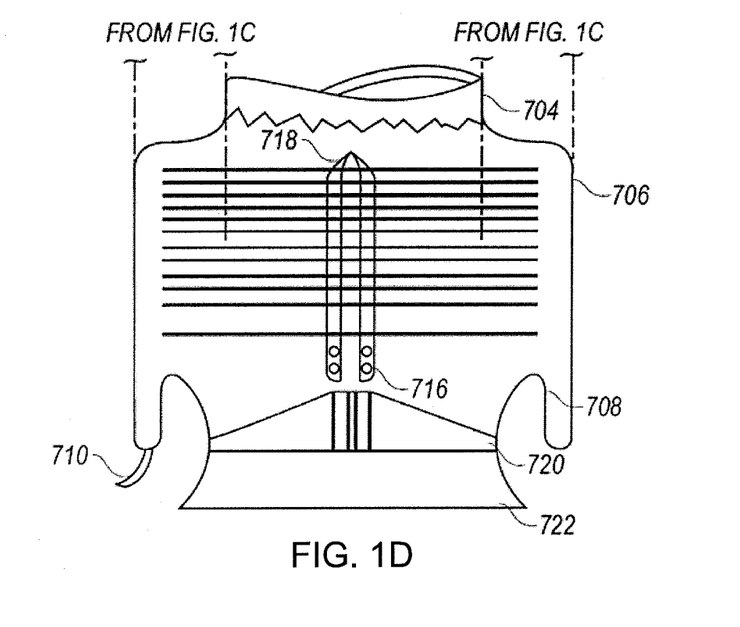

In certain exemplary applications of the system 100 and/or 180, it is desirable to combine acoustical attenuation of exhaust noise with condensate water collection to provide a lightweight system with additional safety capabilities. FIGS. 10 and 1D show an exemplary embodiment of an apparatus 700 (top view shown in FIG. 1C and partial side-section view shown in FIG. 1D. For example, the apparatus 700 can be configured to provide a relatively smaller diameter muffler than conventional designs along with new benefits and outcomes. The apparatus 700 includes a system of spaced rotor disks 702 that are supported on stationary tube spindle 718 by bearing assembly 716 and one or more suitable support fins 720. The exemplary spinning rotor disks 702 can be perforated with various optimized patterns of suitably shaped passageways 712 and/or louvers 714 for directing flow from inlet conduit 704 to shroud 706 and to an additional exhaust conduit to an interface with the atmosphere, e.g., such as bell 722. Shroud 706 further cools and collects growing droplets of condensate that disks 702 sling to the larger diameter of the periphery for collection through a collection component 708 including one or more pumps that deliver to a tube 710 for connection to a pump, e.g., such as the pump 186 of the system 180.

For example, the kinetic energy from exhaust gases in the inlet conduit 704 is transferred to features such as the perforations and/or louvers 714 to cause the exemplary droplet nucleation rotor disks 702 to spin for the combined purposes of cooling, e.g., converting acoustical wave energy into work for the spinning rotor disks 702 and slinging water droplets to the shroud 706 for collection. Accordingly, for example, exhaust gases such as nitrogen, carbon dioxide, and/or oxygen are dried to the extent provided by water condensate removal through the tube 710 and are then rerouted to the exhaust bell 722 for very low pressure drop and accomplishment of combined exhaust noise quieting, water vapor cooling, and condensate collecting functions. In some implementations, the exhaust bell 722 may be near or at some distance away from support fins 720 as may be optimized according to the vehicle application requirements.

Additional functions as described can be used to provide for emergency blowdown of vapor or gases through the injector 116 and/or the injector 152 to the combustion chamber 158 and through one or more open exhaust valves 157 to the exhaust pipe 114 for delivery to assembly 700. The apparatus 700 provides a low clearance volume heat quenching system for blocking ignition and/or flame travel from inside of the inlet conduit 704 and similarly for blocking ignition sources outside of the bell 722 and effectively attenuating the heat and pressure of such emergency blowdown gases to protect anyone in the downstream zone of exhaust flow that would otherwise blast out of a conventional exhaust system.

Equation 5, depicts an exemplary case for the beneficial production and delivery of vapor or gaseous phase fuel constituents by the described armored fuel conversion systems, e.g., such as at times in which the system 180 is implemented without water additions.

$$CH_3OH + \Delta \rightarrow CO + 2H_2 \quad \text{(Eq. 5)}$$

Equation 6, depicts another example in which part of the endothermic energy $\Delta$ is produced by partial oxidation. In such instances, such separated oxygen may be delivered by filtration including membrane or pressure or temperature swing adsorption from atmospheric air. Oxygen may also be produced from other sources such as the electrolysis of sulfuric acid solutions, e.g., such as in an electrolyzer 526 of a system 500, as shown in U.S. patent application entitled "CHEMICAL FUEL CONDITIONING AND ACTIVATION", filed on or before Mar. 15, 2013, which is incorporated in its entirety by reference as part of the disclosure in this patent document.

$$C_2H_5OH + 0.5O_2 + \Delta \rightarrow 2CO + 3H_2 \quad \text{(Eq. 6)}$$

In some exemplary instances in which it is desired to inject the vapors or gaseous fuel constituents at elevated temperatures, such as the disclosed vapors or gaseous fuel constituents used in the systems 100 and/or 180, or the system 500 described in the incorporated reference entitled "CHEMICAL FUEL CONDITIONING AND ACTIVATION". The vapors or gaseous fuel constituents can be injected using an apparatus 600, as shown in co-pending application 61/725,448. The apparatus 600 can be implemented to provide, the armored delivery of the vapors or gaseous fuel constituents into the combustion chamber zone 618. Description of the apparatus and its operation of the fuel injector apparatus 600 is provided in U.S. patent application entitled, "MECHANICAL MOTION AMPLIFICATION FOR NEW THERMODYNAMIC CYCLES", filed on or before Mar. 15, 2013,, which is incorporated in its entirety by reference as part of the disclosure in this patent document.

Figure 2:
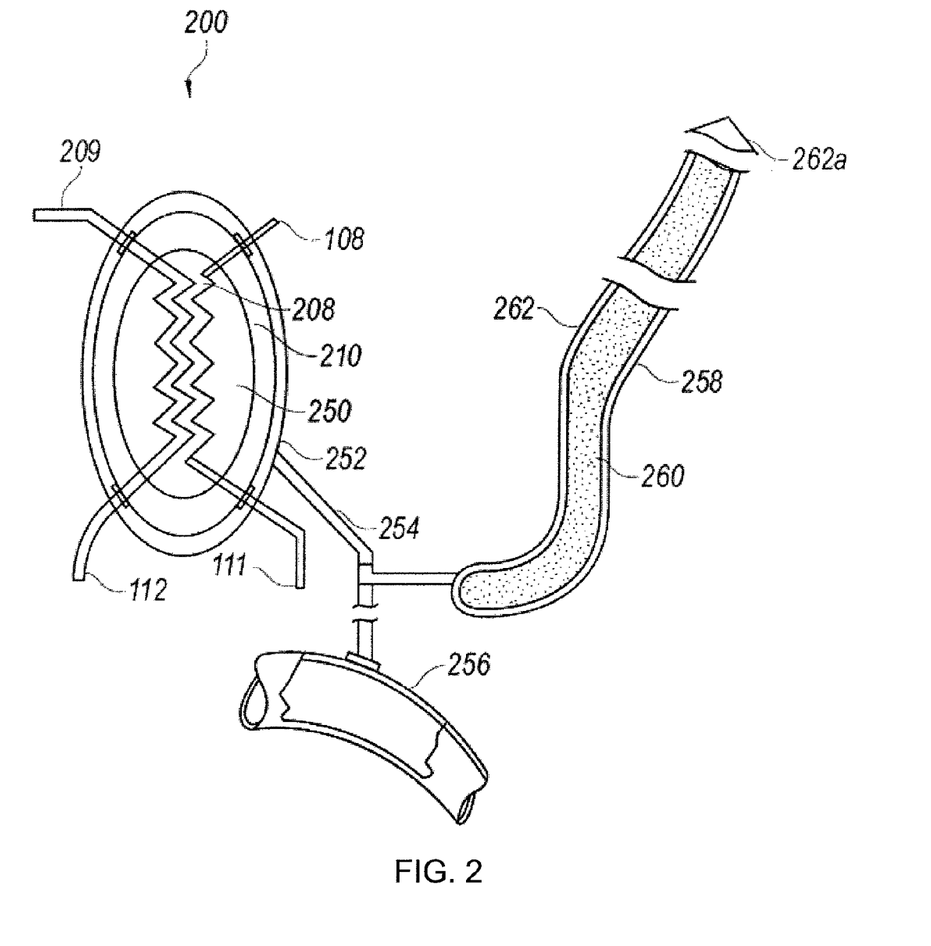
FIG. 2 shows a diagram of an exemplary system to provide capabilities to convert a liquid fuel into a gaseous fuel substance.

FIG. 2 shows a diagram of a system 200 to provide further safety capabilities for converting a liquid fuel into a gaseous fuel substance. The system 200 can be integrated in the exemplary systems 100 or 180. The system 200 includes heat exchanger circuits 208 and 209 structured to include tube structures that can comprise, for example, conductively coupled steel, stainless steel or super alloy tubing. For example, the tube structures may be configured by placing the tube for the circuit 208 in a suitably larger tube, e.g., such as that of the circuit 209, to develop an additional layer of armor. In some implementations, the tube structure of the circuit 209 is designed as a considerably heavier-walled safety containment tube. This can provide very high heat transfer capabilities that may be enhanced by knurling or otherwise providing surface features on the inside and/or outside of the tube structure of the circuits 208 and/or 209 that accelerate the fluids undergoing heat exchanges to improve the operating efficiency and effectiveness. The exemplary heat exchange circuits 208 and/or 209 may be further contained in an inert substance, e.g., such as a fluid or a suitable fused salt medium 250 that is contained in an insulated layer 252 of pressure-rated vessel 210.

In some embodiments, for example, the zone 250 can serve as an accumulator for storage of pressurized water, steam, a fuel reactant, or product constituents. In such applications, reinforcement of the vessel 210 is provided to armor the relatively small process events against damages that could cause leakage or malfunctions. Additional security can be provided by another barrier and collection assembly within the insulated layer 252 to provide substantially greater safety than conventional fuel management systems. For example, the insulated layer assembly 252 can be configured as an outer barrier jacket designed and constructed of an extremely tough stainless steel alloy foil or as a fiber-reinforced composite that provides for the collection and delivery via a conduit 254 of any leakage that may occur from the tube structures of the circuits 208 and/or 209, or the containment tank 102. For example, then the delivery of any such collected leakage would be made to a safe zone such as exhaust pipe 256 and/or conduit 258.

The exemplary exhaust pipe 256 can be designed and constructed of heat and corrosion resistant materials that are suitable for long-term thermal cycling operations such as the containment conduit for hot exhaust gases from engines. For example, such exhaust gases may at times be highly aggressive oxidants, and at other times they may become acidic or reducing agents that are resisted by the exemplary exhaust pipe 256. In some applications, for example, the exhaust pipe 256 is structured to include a double-walled structure to provide insulation and prevent wind chill for retention of the heat in exhaust gases. Such exemplary double-walled construction provides another degree of containment and armor against adverse consequences, e.g., due to collisions and/or other types of damage.

These thermal shock, oxidation and reduction resistant, and superior heat containment capabilities of the exemplary exhaust pipe 256 are utilized in the exemplary application of the system 200 to make exhaust pipe 256 a suitable receiver for any leakage that may occur in the case of crash impact damage or other failures of the tube structures of the heat exchanger circuits 208 and/or 209 and/or the vessel 210. Thus, for example, leakage that may occur in this critical circuit can be drained safely into a relatively larger pressure blow-down capacity of conduit 256, as shown. The relatively small volume of potentially dangerous fuel in the tubes of the circuits 208 and/or 209, e.g., as compared to the much larger volume and heat and/or pressure dissipation capabilities of the exhaust tube 256, provides a substantially greater degree of safety than conventional fuel delivery systems.

In some embodiments, the system 200 can include other suitable blowdown piping units for heat and/or pressure dissipation. In one example, the system 200 can include a separate tube such as the conduit 258 to provide a substantially greater degree of safety, e.g., than conventional fuel delivery systems. The conduit 258 may provide a portion that aims potential leakage in a safer direction than may be found for an exhaust pipe, e.g., such as the exhaust pipe 256. Additional safety features may be provided by a dissipater cap 262a, of the system 200 that is also designed and constructed to prevent the entry of rain, dust, and/or insects into the interior portions of the tube assembly 258. In addition, the conduit 258 may include pressure and/or heat dissipating structures or packing contents 260 and an insulator system 262, e.g., such as one or more layers or wraps or a double wall, to contain a foam or fibrous selection of thermal insulation to further improve safety capabilities.

Figure 3A:
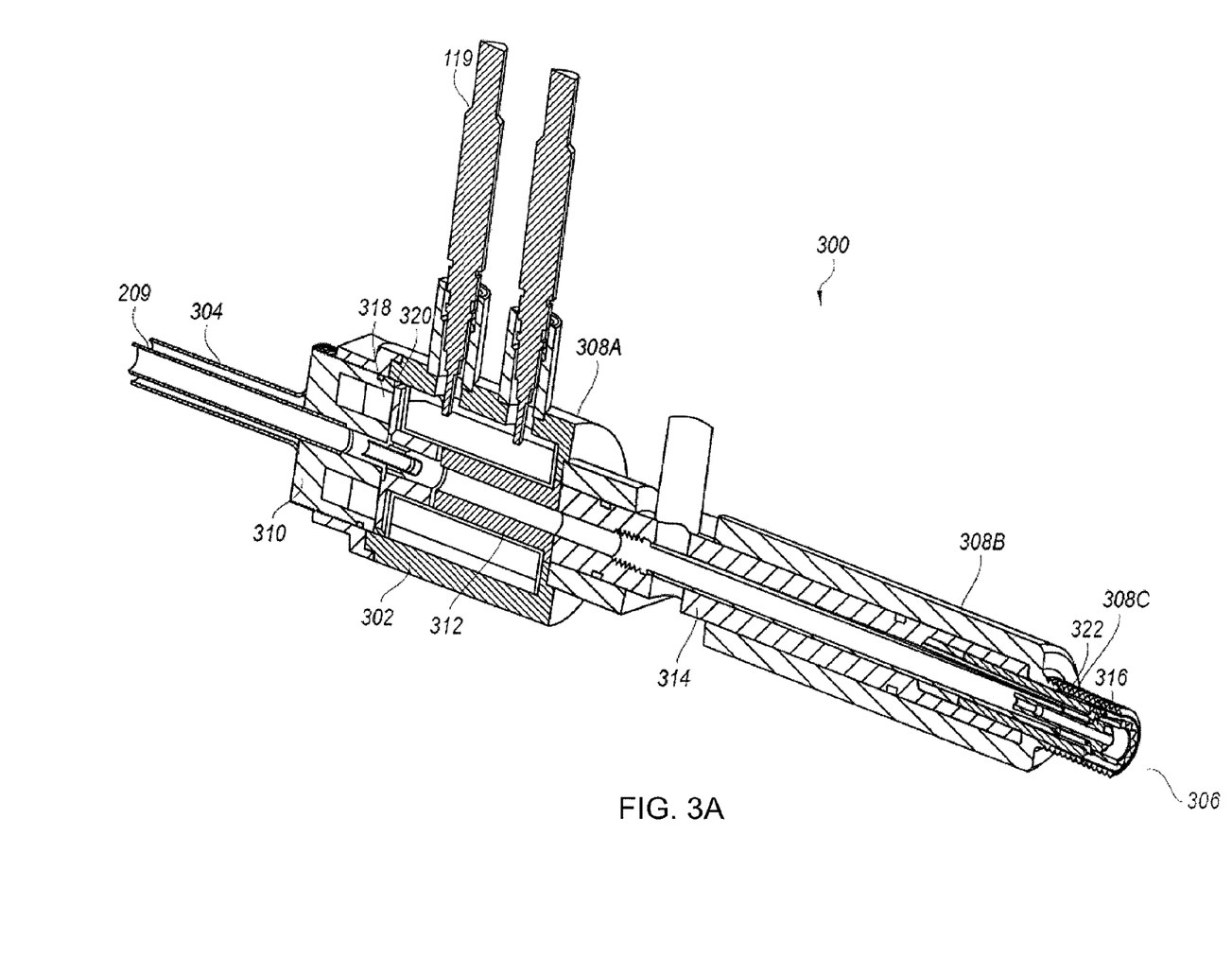
FIG. 3A shows a schematic of an exemplary system to deliver pressurized fuel into a combustion chamber.

Fuel management can be further provided by system 300, as shown in FIG. 3A. FIG. 3A shows a cross-sectioned view of the system 300 showing an exemplary high safety tube (e.g., such as the tube structure of the circuit 209 of system 200 in FIG. 2) interfaced with an armored tube 304 of the system 300 to deliver pressurized fuel into assembly 302. In some implementations, the tube structure of the circuit 209 may be further armored by the exemplary armored tube 304, e.g., against damage and to provide thermal insulation for the flow of vapors and/or gases from fail-safe processes in the fuel conversion unit assemblies 110 and 112. Delivery of the pressurized fuel into a combustion chamber 306 (of an engine) by the armored fuel ignition system 300 further offering enhanced safety by containment capabilities of the exhaust pipe 114 or 256 for protection of the fuel conversion unit assembly 112 coupled with the exemplary armored containment and improved fail-safe blowdown provisions of system 200.

The system 300 can be configured to provide layers of fail-safe structural containment capabilities. In some embodiments, the system 300 can be structured to include pressure containment shell portions 308A, 308B, and 308C, within which are pressure containing sub-assemblies 310, 312, and 314, as shown in FIG. 3A. The system 300 can also be configured to provide automatic actuation of over-pressure bleed down. In some embodiments, the system 300 can be structured to include a valve 316 interfaced with a port into the combustion chamber 306 to further improve overall system safety. For example, in the event that over-pressurization of fuel including fluid (e.g., such as vaporous reactants and/or gaseous products as shown by Equations 3, and/or 4) exceeds a safety limit, the valve 316 is opened by such pressure. In operation, for example, the valve 316 is normally held closed by force exerted by permanent magnet 318 on armature 320 and thus on the connecting linkage to valve 316 to hold it closed against seat 322. For example, at an ultimately fail-safe moment, pressure over a safety limit forces the valve 316 open to relieve such pressure by allowing fuel to flow into the combustion chamber 306 and upon closure of throttle valve 126 through any exhaust valves to the exhaust pipe 114 or 256 or the conduit 258.

Figure 3B:
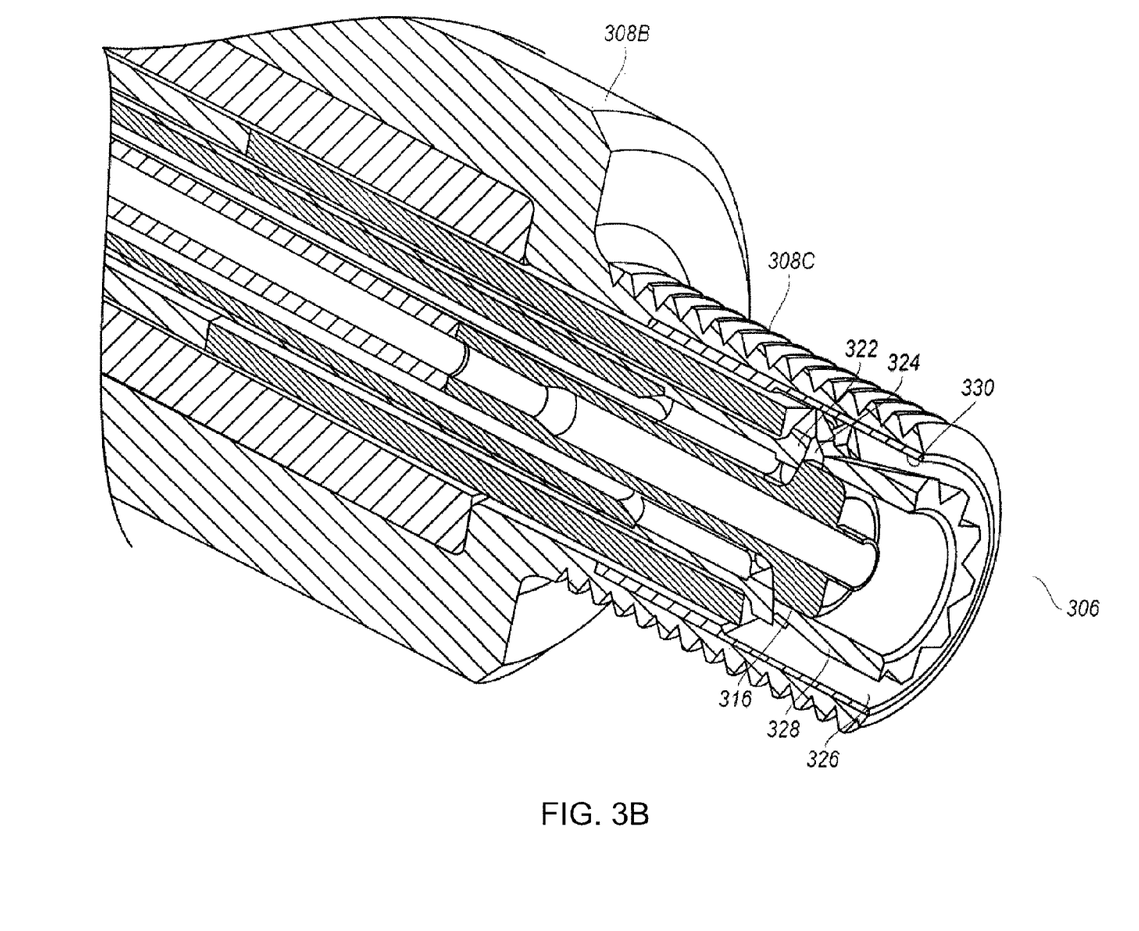
FIG. 3B shows an enhanced view of some exemplary components of the exemplary system shown in FIG. 3A.

FIG. 3B shows additional details of the exemplary embodiment of the system 300 shown in FIG. 3A, including the exemplary pressure assisted or over-pressure actuated outward opening valve 316, the corresponding valve seat 322, radial flow ports 324, and annular passageway 326 between ignition electrodes 328 and 330 configured for providing rapid blowdown of fuel constituents into the combustion chamber 306 (e.g., in case of emergency). FIG. 3B also shows the particularly rugged and multilayered armored construction within the exemplary case assembly 308A, 308B and 308C of the system 300 to resist or administer fail-safe processes in instances of experiencing severe impact forces, e.g., such as those that might be present in a vehicle collision.

Further enhancements of safety can be provided by a new or reprogrammed controller 122 in response to alarms, e.g., such as fuel leakage detection or a crash impact indication typical of an event that would trigger deployment of air bags. In such instances, for example, the controller 122 signals by wireless communication or connection through cables (e.g., such as cables 119) to trigger events including, but not limited to, the shutdown of the exemplary fuel ignition subsystem of the system 300 and closure of the valve 126; the shutoff of the pump 104 to stop fuel flow from the tank 102; and the actuation of the armature 320, e.g., which is forced away from the magnet 318 to open the valve 316 and quickly bleed-down fluid between the tank 102 to the combustion chamber 306. This is particularly effective in multi-cylinder engine operations, for example, because of the large simultaneous flow path provided past valves (e.g., such as the valve 316) in each cylinder and because some cylinders will have large clearance volumes and/or pathways to blow down through open exhaust valves into exhaust containment pipe (e.g., such as the exhaust pipe 256). Such emergency closure of the valve 126 by the, present embodiment for operation by the exemplary controller 122 provides shutoff of air and thus the rapid elimination of oxygen that would support combustion and prevents the escape of any fuel constituent that might pass through an open intake valve.

Implementation of the disclosed fuel systems, devices, and methods can provide for improved fuel storage and utilization. Fuel storage and utilization can be achieved based on the disclosed features and techniques, e.g., including, but not limited to, application of the throttle valves (e.g., such as valve 126 of the systems 100 and/or 180), utilization of the heat and pressure dissipating capabilities of exhaust valves, exhaust manifolds, and exhaust pipe systems, the reduction or elimination of toxicity characteristics, and the armored production and delivery of fuel constituents with far more rapid escape characteristics of any potential leakage of vapors and gases compared to liquid fuels. Implementation of the disclosed fuel systems, devices, and methods provide improved fuel economy and engine performance. For example, the disclosed systems, devices, and techniques can be combined with the vaporization and/or gasification of conventional and/or new fuel compositions, e.g., including conversions that provide "net hydrogen" accomplishments that enable much greater public safety from harmful pollutants and greenhouse gas accumulation for additional public benefits.

In another aspect, a method to provide a fuel for an engine includes mixing formic acid with water to produce a liquid fuel, adding a fuel constituent in the liquid fuel, the fuel constituent being soluble in the liquid fuel, and converting, in a container having an interior formed of an armored material, the liquid fuel into a gaseous fuel substance using at least one of heat energy or electrical energy to pressurize the liquid fuel, the gaseous fuel substance exhibiting a higher pressure and lower density than that of the liquid fuel. In some examples, the fuel constituent can include urea, cellulose, starches, lipids, carbohydrates, amino acids, proteins, and other food products. In some exemplary implementations of the method, the method can include mixing the formic acid with selected alcohols, e.g., such as methanol and/or ethanol. In this example, the mixing the formic acid with the selected alcohol can be implemented with or without water. In some exemplary implementations, the formic acid is included in liquid fuel solutions to provide for denaturing of stored fuel and/or as an odorant and/or to serve with an electronic or optical detector as a more easily detected agent for early detection of incipient fuel leaks. In other exemplary implementations of the method, the mixing the formic acid is not implemented and the formic acid serves as the liquid fuel.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

EXAMPLES

The following Examples are illustrative of several embodiments of the present technology.

1. A system for producing a fuel, comprising:
   a fuel storage unit to contain a liquid fuel substance stored at a low pressure;
   a fuel conversion unit to convert the liquid fuel substance into a gaseous fuel substance using at least one of heat energy or electrical energy to pressurize the liquid fuel substance, the fuel conversion unit including a tank having an interior formed of an armored material; and
   a fluid transfer unit including a low pressure pump to deliver the liquid fuel substance from the fuel storage unit to the fuel conversion unit,
   wherein the gaseous fuel substance exhibits a higher pressure and lower density than that of the liquid fuel substance.

2. The system as in example 1,, wherein the heat energy is supplied to the fuel conversion unit by an exhaust system of an engine.

3. The system as in example 1,, wherein the fuel transfer unit delivers the gaseous fuel substance to an engine.

4. The system as in example 1,, further comprising a fuel cell to supply heat to the fuel conversion unit.

5. The system as in example 1,, wherein the armored material includes at least one of stainless steel or composite material including multilayers of at least one of stainless steel, carbon nanotubes, partially stabilized zirconia or spinel, or aluminum.

6. The system as in example 1,, wherein the armored material includes at least one type of polymers including polyimides or Kevlar film or fiber.

7. The system as in example 1,, wherein the liquid fuel substance includes a hydrogen donor constituent, carbon donor constituent, or nitrogen donor constituent.

8. The system as in example 1,, further comprising a controller to trigger a shutdown of the system.

9. A method for producing an alcohol fuel, comprising:
   mixing an alcohol with water to produce a wet alcohol; and
   adding a fuel constituent in the wet alcohol, the fuel constituent being soluble in the wet alcohol.

10. The method as in example 9,, wherein the alcohol is a substantially pure alcohol.

11. The method as in example 9,, wherein the alcohol includes methanol.

12. The method as in example 11,, further comprising creating the methanol by:
   applying heat to a methane feedstock substance to produce hydrogen and a carbon substance, and
   reacting the hydrogen with carbon dioxide to create the methanol and water.

13. The method as in example 12,, wherein the methane feedstock substance is supplied from exhaust gas produced by an engine.

14. The method as in example 9,, wherein the fuel constituent is selected from the group consisting of urea, cellulose, starches, lipids, carbohydrates, amino acids, proteins, and food products.

15. The method as in example 9,, further comprising adding an odorizing agent to provide a scent to the wet alcohol.

16. The method as in example 15,, wherein the odorizing agent includes at least one of wintergreen oil, methyl salicylate, or peppermint.

17. A method to provide a fuel for an engine, comprising:
mixing an alcohol with water to produce a wet alcohol;
adding a fuel constituent in the wet alcohol to form a liquid fuel, the fuel constituent being soluble in the wet alcohol; and
converting, in a container having an interior formed of an armored material, the liquid fuel into a gaseous fuel substance using at least one of heat energy or electrical energy to pressurize the liquid fuel, the gaseous fuel substance exhibiting a higher pressure and lower density than that of the liquid fuel.

18. The method as in claim 17,, further comprising supplying the heat energy to the container from at least one of an exhaust system of an engine or a fuel cell.

19. The method as in example 17,, further comprising delivering the gaseous fuel substance to a fuel cell and/or a heat engine.

20. The method as in example 17,, wherein the armored material includes at least one of stainless steel or composite material including multilayers of at least one of stainless steel, carbon nanotubes, partially stabilized zirconia or spinel, or aluminum.

21. The method as in example 17,, wherein the armored material includes at least one type of polymers including polyimides or Kevlar film or fiber.

22. The method as in example 17,, wherein the fuel constituent is selected from the group consisting of urea, cellulose, starches, lipids, carbohydrates, amino acids, proteins, and food products.

23. The method as in example 17,, further comprising adding an odorizing agent to provide a scent to the wet alcohol.

24. The method as in example 23,, wherein the odorizing agent includes at least one of wintergreen oil, methyl salicylate, or peppermint.

25. A method to provide a fuel for an engine, comprising:
mixing an alcohol with water to produce a wet alcohol;
suspending a fuel constituent in the wet alcohol to form a liquid fuel; and
converting, in a container having an interior formed of an armored material, the liquid fuel into a gaseous fuel substance using at least one of heat energy or electrical energy to pressurize the liquid fuel, the gaseous fuel substance exhibiting a higher pressure and lower density than that of the liquid fuel.

26. A method to provide a fuel for an engine, comprising:
mixing formic acid with water to produce a liquid fuel;
adding a fuel constituent in the liquid fuel, the fuel constituent being soluble in the liquid fuel; and
converting, in a container having an interior formed of an armored material, the liquid fuel into a gaseous fuel substance using at least one of heat energy or electrical energy to pressurize the liquid fuel, the gaseous fuel substance exhibiting a higher pressure and lower density than that of the liquid fuel.

Only a few implementations and examples are described and other implementations, enhancements and variations can be made based on what is described and illustrated in this patent document. From the foregoing it will be appreciated that, although specific embodiments of the technology have been described herein for purposes of illustration, various modifications may be made without deviating from the spirit and scope of the technology. Further, certain aspects of the new technology described in the context of particular embodiments may be combined or eliminated in other embodiments. Moreover, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein. Thus, the disclosure is not limited except as by the appended claims.

I claim:

1. A method to provide a fuel for an engine, comprising:
mixing an alcohol feedstock with water to produce a wet alcohol;
forming a liquid fuel by adding a fuel constituent in the wet alcohol, the fuel constituent selected to be soluble in the wet alcohol; and
converting, in a container having an interior formed of an armored material, the liquid fuel into a gaseous fuel substance using at least one of heat energy or electrical energy to pressurize the liquid fuel, the gaseous fuel substance exhibiting a higher pressure and lower density than that of the liquid fuel.

2. The method as in claim 1, further comprising supplying the heat energy to the container from at least one of an exhaust system of an engine or a fuel cell.

3. The method as in claim 1, further comprising delivering the gaseous fuel substance to a fuel cell and/or a heat engine.

4. The method as in claim 1, wherein the armored material includes at least one of stainless steel or composite material including multilayers of at least one of stainless steel, carbon nanotubes, partially stabilized zirconia or spinel, or aluminum.

5. The method as in claim 1, wherein the armored material includes at least one type of polymers including polyimides or Kevlar film or fiber.

6. The method as in claim 1, wherein the fuel constituent is selected from the group consisting of urea, cellulose, starches, lipids, carbohydrates, amino acids, proteins, and food products.

7. The method as in claim 1, further comprising adding an odorizing agent to provide a scent to the wet alcohol.

8. The method as in claim 7, wherein the odorizing agent includes at least one of wintergreen oil, methyl salicylate, or peppermint.

9. The method as in claim 1, wherein the alcohol feedstock includes methanol.

10. The method as in claim 1, further comprising:
converting a methane feedstock into hydrogen and carbon by applying heat to the methane feedstock; and reacting the hydrogen with carbon dioxide to produce the alcohol feedstock and water.

11. The method as in claim 1,
wherein the forming the liquid fuel further includes suspending one or more insoluble fuel constituents in the wet alcohol.

12. The method as in claim 11, further comprising:
adding one or more surfactants to emulsify the insoluble fuel constituents with the wet alcohol to form the liquid fuel.

13. A method to provide a fuel for an engine, comprising:
mixing an alcohol feedstock with water to produce a wet alcohol;
forming a liquid fuel by dissolving a fuel constituent selected to be soluble in the wet alcohol; and
converting, in a container having an interior formed of an armored material, the liquid fuel into a gaseous fuel substance using at least one of heat energy or electrical energy to pressurize the liquid fuel, the gaseous fuel substance exhibiting a higher pressure and lower density than that of the liquid fuel.

14. The method as in claim 13, further comprising supplying the heat energy to the container from at least one of an exhaust system of an engine or a fuel cell.

15. The method as in claim 13, further comprising delivering the gaseous fuel substance to a fuel cell and/or a heat engine.

16. The method as in claim 13, wherein the armored material includes at least one of stainless steel or composite material including multilayers of at least one of stainless steel, carbon nanotubes, partially stabilized zirconia or spinel, or aluminum.

17. The method as in claim 13, wherein the armored material includes at least one type of polymers including polyimides or Kevlar film or fiber.

18. The method as in claim 13, wherein the fuel constituent is selected from the group consisting of urea, cellulose, starches, lipids, carbohydrates, amino acids, proteins, and food products.

19. The method as in claim 13, further comprising adding an odorizing agent to provide a scent to the wet alcohol.

20. The method as in claim 19, wherein the odorizing agent includes at least one of wintergreen oil, methyl salicylate, or peppermint.

21. The method as in claim 13, wherein the alcohol feedstock includes methanol.

22. The method as in claim 13, further comprising:
converting a methane feedstock into hydrogen and carbon by applying heat to the methane feedstock; and
reacting the hydrogen with carbon dioxide to produce the alcohol feedstock and water.

23. The method as in claim 13, wherein the forming the liquid fuel further includes suspending in the wet alcohol one or more additional fuel constituents selected to be insoluble in the wet alcohol.

24. The method as in claim 23, wherein the suspending the one or more additional fuel constituents in the wet alcohol further includes adding one or more surfactants to emulsify the insoluble fuel constituents with the wet alcohol.

* * * * *